(12) United States Patent
Blakborn (10) Patent No.: US 11,749,944 B2
(45) Date of Patent: Sep. 5, 2023

(54) FASTENING SCREW, ELECTRICAL PLUG CONNECTOR AND ELECTRICAL PLUG CONNECTION

(71) Applicant: Rosenberger Hochfrequenztechnik GmbH & Co. KG, Fridolfing (DE)

(72) Inventor: Willem Blakborn, Inzell (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 125 days.

(21) Appl. No.: 17/221,117

(22) Filed: Apr. 2, 2021

(65) Prior Publication Data

US 2021/0320454 A1 Oct. 14, 2021

(30) Foreign Application Priority Data

Apr. 9, 2020 (EP) .................................. 20169030

(51) Int. Cl.
*H01R 13/622* (2006.01)
*H01R 13/405* (2006.01)
*F16B 33/00* (2006.01)

(52) U.S. Cl.
CPC ......... *H01R 13/622* (2013.01); *F16B 33/006* (2013.01); *H01R 13/405* (2013.01)

(58) Field of Classification Search
CPC . H01R 4/34; H01R 4/36; H01R 13/40; H01R 13/44; H01R 13/53; H01R 13/62; H01R 13/405; H01R 13/502; H01R 13/622; H01R 13/625; F16B 33/006
See application file for complete search history.

(56) References Cited

U.S. PATENT DOCUMENTS

| | | | |
|---|---|---|---|
| 3,078,334 A * | 2/1963 | Forman | F16B 25/0094 174/138 D |
| 4,975,014 A * | 12/1990 | Rufin | F16B 35/00 403/30 |
| 5,569,008 A * | 10/1996 | Chapkovich | F16B 33/006 411/383 |
| 7,896,599 B2 * | 3/2011 | Stephen | F16B 35/00 470/14 |
| 8,105,004 B2 * | 1/2012 | Stephen | F16B 35/00 411/377 |
| 8,308,776 B2 * | 11/2012 | Abdou | A61B 17/8605 606/279 |

(Continued)

FOREIGN PATENT DOCUMENTS

| | | |
|---|---|---|
| DE | 102014012320 B3 | 11/2015 |
| EP | 3389146 A1 | 10/2018 |
| EP | 3664225 A1 | 6/2020 |

OTHER PUBLICATIONS

European Search Report dated Sep. 16. 2020.

*Primary Examiner* — Oscar C Jimenez
(74) *Attorney, Agent, or Firm* — Randall Danskin P.S.

(57) ABSTRACT

The invention relates to a fastening screw, comprising an electrically insulating insulating body and a metal body formed from a metal and having an external thread. The metal body is fastened on the insulating body and has a first axial end and a second axial end opposite the first axial end, wherein the first axial end is remote from a screw head of the fastening screw. It is provided that the insulating body, by means of a shaft portion, emerges from the first axial end of the metal body along the longitudinal axis (L) of the metal body.

16 Claims, 5 Drawing Sheets

(56) References Cited

U.S. PATENT DOCUMENTS

| | | | |
|---|---|---|---|
| 8,616,815 B2* | 12/2013 | Cooper | F16B 35/041 |
| | | | 411/361 |
| 9,490,557 B2 | 11/2016 | Hirakawa | |
| 10,205,274 B2 | 2/2019 | Loncar | |
| 10,381,752 B2 | 8/2019 | Kaehny | |
| 2005/0187555 A1* | 8/2005 | Biedermann | A61B 17/74 |
| | | | 606/301 |

* cited by examiner

FASTENING SCREW, ELECTRICAL PLUG CONNECTOR AND ELECTRICAL PLUG CONNECTION

CROSS REFERENCE TO RELATED APPLICATIONS

This U.S. Utility Patent Application is a National Stage application of European Patent Application No. 20 169 030.2 which was filed on 9 Apr. 2020 and titled "Fastening screw, electrical plug connector and electrical plug connection. The aforementioned European Patent Application No. 20 169 030.2 is hereby expressly incorporated herein by this reference in its entirety.

BACKGROUND AND SUMMARY

The present invention relates to a fastening screw, in particular for an electrical plug connector, comprising an electrically insulating insulating body and a metal body formed from a metal and having an external thread.

The present invention furthermore relates to an electrical plug connector, having an electrically insulating plug connector housing, a contact element and a fastening screw.

The present invention moreover relates to an electrical plug connection, having an electrical plug connector and an electrical mating plug connector.

Various electrical plug connectors are known from electrical engineering. Electrical plug connectors serve in a known manner for transmitting electrical supply signals and/or data signals to corresponding mating plug connectors. A plug connector or mating plug connector can be a plug, a panel plug, a socket, a coupling or an adapter. The term "plug connector" or "mating plug connector" used within the context of the invention is representative of all variants.

Electrical plug connectors are subject to particular requirements, in particular in the high-voltage range. In the motor industry, high-voltage plug connectors are predominantly used in electric and/or hybrid vehicles in order to supply a vehicle battery with a charging current or in order to draw the stored energy from the battery and feed it to the electric drive. In this case, the electrical plug connection must permanently and safely prevent the penetration of moisture and impurities and ensure the faultless transmission of high currents with a preferably low transfer impedance.

Since high voltages can be applied to the conductive contact elements of the electrical plug connection during operation and also during assembly, it is generally provided for non-conductive housing components to surround the contact elements of the plug connection or the plug connector and/or the mating plug connector in order to prevent such a contact element from being touched accidently by a human finger or a tool. In this case, the touch protection must primarily be safe. However, it must also be easy and cost-effective to produce owing to the mass producibility of the plug connection.

In particular, conductive components or contact elements of the plug connection which must still be initially accessible during assembly, for example electrically conductive fastening screws (in particular "pins"), can generally only be protected against being touched accidentally in a structurally complex manner.

For example, a fastening screw or a pin, by means of a shaft or a pointed end, naturally protrudes from the component to be fastened in the assembly direction in order to be screwed into a complementary depression, for example a screw-nut, during assembly. Touch protection on the shaft of a fastening screw must generally be provided on the lateral faces and moreover also at the end face and, at the same time, must not obstruct the screwing-in of the fastening screw.

Additionally, it is likewise often necessary to also protect the screw head of the fastening screw against being touched accidently, at least after assembly.

To provide touch protection for a pointed end of a fully conductive pin or a fully conductive fastening screw of a plug connector, it is proposed in U.S. Pat. No. 10,205,274 B2, for example, to place an insulating protective cap on the end face of the pointed end of the pin provided for the screw fastening in order to at least cover the pointed end of the pin. This can obstruct accidental touching of the pin at the end face. In order to also provide suitable lateral touch protection along the shaft of the pin at the same time, further insulating protective elements are required, which surround the pin all around at a radial spacing. To this end, the insulating protective elements protrude from a plug connector housing as individual webs. In addition to the touch protection in the region of the screw shaft, a further protective cap is provided for the screw head. The design of the plug connector proposed in U.S. Pat. No. 10,205,274 B2 is therefore extremely complex. The plug connector can therefore only be produced in a comparatively complex manner.

In consideration of the known prior art, the object of the present invention consists in providing a fastening screw which ensures particularly safe touch protection for electrically conductive components and is therefore preferably advantageously suitable for use with a plug connector, in particular with a high-voltage plug connector.

The present invention is also based on the object of providing an electrical plug connector which, in particular, has particularly safe touch protection for electrically conductive components and is therefore preferably advantageously suitable for use as a high-voltage plug connector.

Finally, the object of the invention is also to provide an electrical plug connection which, in particular, has particularly safe touch protection for electrically conductive components and is therefore preferably advantageously suitable for use as a high-voltage plug connection.

The dependent claims and the features described herein relate to advantageous embodiments and variants of the invention.

A fastening screw is provided, in particular, for an electrical plug connector, comprising an electrically insulating insulating body and a metal body formed from a metal, and having an external thread.

The metal body can preferably be formed in the shape of a sleeve. The metal body can be formed as a threaded sleeve, for example. The metal body is preferably formed as a component of the screw shaft of the fastening screw.

The fastening screw can also be referred to as a pin or pin contact (in particular for an electrical plug connector).

The fastening screw, in particular in its shaft region, can have a sleeve-shaped portion made from metal and defining the external thread.

By means of the metal body or the metallic external thread of the metal body, a screw connection with sufficient holding torque with a complementary internal thread of a screw-nut (in particular with a screw nut of a mating plug connector) can be realized.

The metal body can comprise copper, aluminum and/or gold, for example. However, any metal or any metal alloy can essentially be provided in order to be able to realize sufficient torque, in particular holding torque. The metal of the metal body can optionally also be chosen in order to be able to contribute to the electric current transmission with a low electrical resistance. However, it is essentially not compulsory for the metal body to also be usable for the current transmission, in particular if a plug connector equipped with the fastening screw additionally has at least one contact element for the current transmission.

The external thread can essentially be any thread. However, a metric ISO thread (DIN 13-1) is preferably provided, preferably a coarse pitch thread of nominal size M3, M4, M5 (particularly preferred), M6 or M8. However, other nominal sizes or thread standards can also be easily suitable.

The insulating body can be, in particular, an insulating body made from a plastic material, preferably a rigid plastic material or hard plastic. Plastic materials which are referred to as hard plastic can, in particular, belong to the thermoplastics group and to the thermosetting group.

The fastening screw can have a screw head and a screw shaft extending from the screw head in the assembly direction.

The screw head can have an interface for engagement of a tool for transmitting a torque, for example a so-called hexagon socket, hexalobular socket or cross recess.

According to the invention, the metal body is fastened on the insulating body. The metal body is preferably fastened coaxially on the insulating body.

The insulating body preferably proceeds through the metal body, at least in sections, or is surrounded by the metal body, at least in sections.

The insulating body is preferably injection-molded into the metal body. As a result, an inseparable connection between the insulating body and the metal body, and therefore a functionally one-piece fastening screw, can be provided The fastening screw can thus be produced in a particularly robust and cost-effective manner.

The metal body is particularly preferably fastened on the insulating body (with form fit, force fit and/or material fit) in a non-twisting and non-removable manner.

According to the invention, the metal body has a first axial end and a second axial end opposite the first axial end, wherein the first axial end is remote from the screw head of the fastening screw.

The first axial end can also be referred to as the pointed end of the fastening screw or the metal body. The second axial end can also be referred to as the flat end or head end of the fastening screw or the metal body.

According to the invention, the insulating body, by means of a shaft portion, emerges from the first axial end of the metal body along the longitudinal axis of the metal body or the fastening screw.

The shaft portion of the insulating body which emerges from the metal body can form the screw shaft of the fastening screw together with the metal body.

The shaft portion of the insulating body preferably proceeds exclusively outside the metal body. Starting from the shaft portion, a fastening portion of the insulating body can extend through the metal body in the direction of the screw head. The insulating body preferably comprises at least the fastening portion and the shaft portion along the longitudinal axis. An insulating material can consequently be provided within the sleeve-shaped region of the metal body (fastening portion), which insulating material is axially elongated beyond the metallic region of the metal body along the longitudinal axis (shaft portion).

Touch protection for the electrically conductive metal body can be advantageously provided as a result of the part of the screw shaft which is formed by the metal body being further elongated by the shaft portion of the insulating body which emerges from the metal body. In particular, accidental touching of the first axial end of the metal body at the end face is obstructed by the shaft portion.

In addition to the touch protection, the screwing-in of the fastening screw into the corresponding receiving means or screw-nut (for example of a mating plug connector) can be facilitated for the installer since the elongated shaft portion can constitute an insertion aid.

Improved heat dissipation from the metal body can moreover be ensured during operation as a result of the inventive touch protection not requiring a separate protective cap covering the pointed end of the pin. Good heat dissipation can be relevant, in particular, if the metal body contributes substantially to the current transmission or, in particular, if high currents are transmitted through the metal body.

Touch protection provided by the shaft portion can furthermore be considerably more robust and reliable than a separate protective cap. It has been shown that, in practice, a protective cap can get lost or fall off the pin or become damaged during delivery, storage and/or assembly.

In an advantageous development of the invention, it can be provided that the shaft portion emerging from the first axial end of the metal body has an axial first region extending from the first axial end of the metal body, wherein the external diameter of the axial first region corresponds to the internal diameter of the metal body or is smaller than the internal diameter of the metal body.

It can thus be ensured that the first axial end of the metal body is not covered by the shaft portion.

The axial first region can optionally extend entirely along the shaft portion. In this case, the shaft portion does not have any further axial regions, in particular the second region mentioned below.

According to a development of the invention, it can be provided that the shaft portion emerging from the first axial end of the metal body has an axial second region extending from the axial first region of the shaft portion, wherein the external diameter of the second region is greater than the internal diameter of the metal body.

The external diameter of the shaft portion can consequently firstly have the first region and then the second region along the longitudinal axis in the assembly direction, wherein the external diameter of the shaft portion is increased after the first region.

The radial widening of the second region is advantageously spaced from the first axial end of the metal body by the first region. As before, the first axial end of the metal body is therefore still not covered by the shaft portion, whereby good heat dissipation from the axial end remains possible. At the same time, the touch protection can be improved by the radial widening in the second region.

According to a development of the invention, it can be provided that the external diameter of the axial second region is smaller than the external diameter of the metal body.

This can provide a compromise between good heat dissipation and safe touch protection.

However, it can essentially also be provided that the external diameter of the axial second region corresponds to the external diameter of the metal body. However, these variants are not preferred. Although the first axial end of the metal body is also not covered in these cases owing to the air gap provided by the axial first region of the shaft portion, the heat dissipation, in particular along the longitudinal axis, can be impaired.

In a development of the invention, it can be provided that the axial second region and/or the axial first region of the shaft portion has one or more axial grooves or notches arranged around the longitudinal axis.

In one configuration of the invention, it can also be provided that the axial first region of the shaft portion and/or the axial second region of the shaft portion is formed as a circular cylinder or as a hollow cylinder or is formed by a plurality of cylinder segments arranged around the longitudinal axis.

Recesses in the shaft portion or segmentations in the shaft portion can further improve the air circulation or heat dissipation. It is moreover possible to save on material without impairing the touch protection.

In a development of the invention, it can be provided that the insulating body proceeds through a through-bore of the metal body or is received in a blind hole extending from the first axial end of the metal body in the direction of the screw head.

The insulating body particularly preferably proceeds through a through-bore of the metal body, since a through-bore in the metal body can be realized in a particularly simple manner. In particular, in this case, the metal body can be advantageously formed by a rolled sheet metal part.

In an advantageous development of the invention, it can be provided that the insulating body, by means of a head portion, protrudes from the second axial end of the metal body along the longitudinal axis of the metal body. The insulating body can therefore have, in particular, the three portions: "head portion", "fastening portion" and "shaft portion".

As a result of the insulating body also emerging from the second axial end of the metal body, this can additionally provide touch protection for the second axial end of the metal body.

In a development of the invention, it can be provided that the metal body has a radial widening in the region of the screw head in order to form a contact face for the fastening screw.

The metal body can consequently form part of the screw head. In particular, the metal body, by means of the contact face, can form a so-called "chin" of the screw head in order to ensure the force transmission for the fastening screw.

In an advantageous development of the invention, it can be provided that the screw head is formed by the insulating body.

The insulating body, in particular the head portion of the insulating body, can preferably form the screw head of the fastening screw, at least in part.

The insulating body particularly preferably forms the main part of the screw head.

The insulating body, in particular the head portion of the insulating body, can form an interface for engagement of a tool for transmitting a torque. The interface can be formed, for example, as a hexagon socket, a hexalobular socket or a cross recess.

The insulating body can moreover form the contact face for the fastening screw (the "chin" of the screw head), exclusively or possibly in addition to the metal body.

In an advantageous development of the invention, it can be provided that the external diameter of the screw head is greater than the external diameter of the radial widening or the contact face of the metal body.

The insulating body can provide even better touch protection as a result of the external diameter of the screw head, in particular the screw head formed by the insulating body or the head portion thereof, being larger than the external diameter of the radial widening of the metal body. In particular, by means of the screw head near to the metal body, still further conductive components of a plug connector equipped with the fastening screw (for example contact elements, busbars or electrical connections) can also be optionally protected against being touched accidentally.

In an advantageous development of the invention, it can be provided that the insulating body covers the second axial end of the metal body at the end face.

An end-face touch protection in the region of the (flat) second axial end of the metal body can thus be provided or improved.

In a development of the invention, it can be provided that the wall thickness of the metal body, at least in the region of the external thread, is 0.5 mm to 2.0 mm, preferably 0.7 mm to 1.5 mm, particularly preferably 0.8 mm to 1.2 mm and especially preferably approximately 1.0 mm.

A sufficient minimum wall thickness of the metal body can be advantageous in order to ensure that the fastening screw is capable or realizing sufficient torque, in particular holding torque. In this case, the wall thickness can depend on the metal used to form the metal body.

The invention also relates to a method for producing a fastening screw which has an electrically insulating insulating body and a metal body formed from a metal and having an external thread. The metal body has a first axial end and a second axial end opposite the first axial end, wherein the first axial end is remote from a screw head of the fastening screw. It is provided that the metal body is applied to the insulating body, or the insulating body is incorporated in the metal body, in such a way that the insulating body, by means of a shaft portion, emerges from the first axial end of the metal body along the longitudinal axis of the metal body.

In particular, it is thus possible to provide a fastening screw for an electrical plug connector or for a module connector, in which touch protection is integrated. The fastening screw and the touch protection can be advantageously formed in one piece, whereby only low storage and assembly costs are incurred.

The metal body can be formed by a flat sheet-metal part, for example. The metal body can also be manufactured from a cylindrical metal part, for example, which is provided with a through-bore or with a blind hole along the longitudinal axis.

The insulating body can preferably be injection-molded into the metal body by means of an injection molding procedure.

A particularly advantageous fastening screw can be provided if the insulating body is incorporated in the metal body in such a way that the first axial end of the metal body is not covered by the insulating body.

The invention moreover relates to an advantageous use of a fastening screw for an electrical plug connector. A fastening screw formed as a plastic element with an integrated metal thread can consequently be advantageously used for mechanical connection of the plug connector to a complementary mating plug connector.

The invention also relates to an electrical plug connector, having an electrically insulating plug connector housing, a contact element and a fastening screw, in particular a fastening screw according to the embodiments above and below. The contact element is received in the plug connector housing and is accessible at the end face for making contact with a mating contact element of a mating plug connector. The fastening screw is guided through a through-bore of the contact element in order to be usable for mechanical connection to an internal thread of the mating plug connector (for example an internal thread of a screw-nut).

The electrical plug connector can also be referred to as a "module connector" and the mating plug connector as a "module mating connector".

The fastening screw of the plug connector can advantageously provide touch protection in order to obstruct accidental touching of the screw tip or the first axial end of the metal body.

The pointed end or the first axial end of the metal body is particularly preferably not covered by the touch protection. In particular, a particularly advantageous touch protection, at the same time with good heat dissipation, can be provided by an axial air gap between the metal body and a radial widening of the portion of the insulating body which emerges from the metal body.

The electrical plug connector can have a connection region for connecting the contact element to a busbar or to an electrical conductor of an electric line. The contact element can be connected, for example press-connected or welded, to the busbar or to the electrical conductor in the connection region by means of diverse material-fitting connections (e.g. by laser welding, friction welding, hard soldering, etc.). The connection region can have a fastening means for fastening the busbar or the conductor of the electric line. However, it can essentially also be provided that the contact element is not fastened to the busbar or to the electrical conductor in the connection region since sufficiently stable fastening to the busbar or to the electrical conductor can already be provided by the fastening screw.

According to a development of the inventive plug connector, it can be provided that the shaft portion of the insulating body is dimensioned in such a way that the accessibility of the metal body of the fastening screw in a pre-assembled state of the fastening screw in the plug connector is obstructed, in particular obstructed for a human finger, as a result of the cooperation of the plug connector housing and the shaft portion.

The axial length of the shaft portion can correspond substantially to the axial length of the external thread of the metal body. For example, the axial length of the shaft portion can correspond to at least a quarter of the length of the external thread, preferably to at least a third of the length of the external thread, particularly preferably to at least half the length of the external thread, further preferably to at least two thirds of the length of the external thread, still further preferably to at least three quarters of the length of the external thread, for example also to precisely the length of the external thread. The shaft portion can moreover also be formed such that it is longer than the external thread or shorter than a quarter of the axial length of the external thread.

For example, the axial length of the shaft portion can correspond to at least a quarter of the length of the metal body, preferably to at least a third of the length of the metal body, particularly preferably to at least half the length of the metal body, for example also to at least two thirds of the length of the metal body, to at least three quarters of the length of the metal body or to precisely the length of the metal body. The shaft portion can moreover be formed such that it is longer than the metal body or shorter than a quarter of the axial length of the metal body.

The electrical plug connector can optionally have a washer and/or a screw locking device (for example a Schnorr washer or a lock washer), which is arranged between the fastening screw and the through-bore of the contact element. The force transmission and the safety of the connection, for example the vibration safety of the plug connection, can thus be further improved.

The invention also relates to an electrical plug connection, having an electrical plug connector, in particular according to the embodiments above and below, and an electrical mating plug connector. The mating plug connector has an electrically insulating mating plug connector housing, a mating contact element and an internal thread. The mating contact element is received in the mating plug connector housing and is accessible at the end face for making contact with the contact element of the plug connector. The internal thread is formed for mechanical connection to the external thread of the metal body of the fastening screw.

Touch protection for an electrical plug connection can consequently be advantageously provided, in which separate touch protection elements can be omitted. As a result of the touch protection attributed to the shaft portion of the insulating body, touch protection is created without a protective cap covering the pointed end of the metal body.

The inventive plug connection can be used particularly advantageously in a vehicle, in particular a motor vehicle. In this case, the term "vehicle" describes any mode of transport, in particular land vehicles, water vehicles or aircraft, including spacecraft. Possible areas of use are, in particular, high-voltage plug connections, predominantly in electric and/or hybrid vehicles.

However, the inventive plug connection is suitable for any applications within electrical engineering as a whole and should not be regarded as being limited to use in automotive engineering, nor to use in high-voltage technology.

It goes without saying that features which have been described in connection with the inventive fastening screw can also be advantageously applied to the electrical plug connector, the electrical plug connection, the production method and the use of the fastening screw—and vice versa. Furthermore, advantages which have already been mentioned in connection with the inventive fastening screw can also be understood to relate to the electrical plug connector, the electrical plug connection, the production method and the use of the fastening screw—and vice versa.

In addition, it should be pointed out that terms such as "comprising", "having" or "with" do not rule out other features or steps. Furthermore, terms such as "a" or "the", which refer to steps or features in the singular, do not rule out features or steps in the plural—and vice versa.

In a puristic embodiment of the invention, however, it can also be provided that the features specified in the invention by the terms "comprising", "having" or "with" are listed exhaustively. Accordingly, one or more fists of features can be considered as exhaustive within the context of the invention, for example respectively for each claim. For example, the invention can consist exclusively of the features mentioned in the claims.

It should be mentioned that identifiers such as "first" or "second" etc. are primarily used for the differentiation of respective device or method features and are not necessarily intended to indicate that features are mutually dependent or related to one another.

It should furthermore be emphasized that the values and parameters described here include deviations or fluctuations of ±10% or less, preferably ±5% or less, further preferably ±1% or less and especially preferably ±0.1% or less of the value or parameter mentioned in each case, provided these deviations are not ruled out when implementing the invention in practice. Specifying ranges using starting values and end values covers all those values and fractions which are included by the range mentioned in each case, in particular the starting and end values and a respective median value.

The invention moreover also relates to a fastening screw, comprising a first body and a second body, wherein the second body has an external thread, and wherein the first body, by means of a shaft portion, emerges from at least one axial end of the second body along the longitudinal axis of the second body. The first body can be formed such that it is electrically insulating or electrically conductive. The first body can be, for example, the electrically insulating insulating body described above and below. The second body can be formed such that it is electrically insulating or electrically conductive. The second body can be, for example, the metal body described above and below. The claims which are dependent on Claim 1, the further features of Claim 1 and the embodiments which, above and below, relate to the fastening screw of Claim 1 present advantageous optional developments of the fastening screw mentioned in this section. Furthermore, the fastening screw mentioned in Claims 13 to 15 can also relate to the fastening screw mentioned in this section.

Exemplary embodiments of the invention are described in more detail below with reference to the drawing.

SUMMARY

It is a principal object of the present invention to provide a fastening screw (1), comprising an electrically insulating insulating body (4) and a metal body (5) formed from a metal and having an external thread (6), wherein the metal body (5) is fastened on the insulating body (4) and has a first axial end (7) and a second axial end (8) opposite the first axial end (7), wherein the first axial end (7) is remote from a screw head (2) of the fastening screw (1), and wherein the insulating body (4), by means of a shaft portion (10), emerges from the first axial end (7) of the metal body (5) along the longitudinal axis (L) of the metal body (5).

It is a further object of the present invention to provide a fastening screw (1) characterized in that the shaft portion (10) emerging from the first axial end (7) of the metal body (5) has an axial first region (12) extending from the first axial end (7) of the metal body (5), wherein the external diameter ($d_1$) of the axial first region (12) corresponds to the internal diameter ($d_i$) of the metal body (5).

It is a further object of the present invention to provide a fastening screw (1) characterized in that the shaft portion (10) emerging from the first axial end (7) of the metal body (5) has an axial second region (13) extending from the axial first region (12) of the shaft portion (10), wherein the external diameter ($d_2$) of the axial second region (13) is greater than the internal diameter ($d_i$) of the metal body (5).

It is a further object of the present invention to provide a fastening screw (1) characterized in that the external diameter ($d_2$) of the axial second region (13) is smaller than the external diameter ($d_a$) of the metal body (5).

It is a further object of the present invention to provide a fastening screw (1) characterized in that the axial second region (13) of the shaft portion (10) has one or more axial grooves (18) arranged around the longitudinal axis (L).

It is a further object of the present invention to provide a fastening screw (1) characterized in that the insulating body (4) proceeds through a through-bore (14) of the metal body (5) or is received in a blind hole (17) extending from the first axial end (7) into the metal body (5).

It is a further object of the present invention to provide a fastening screw (1) characterized in that the insulating body (4), by means of a head portion (15), protrudes from the second axial end (8) of the metal body (5) along the longitudinal axis (L) of the metal body (5).

It is a further object of the present invention to provide a fastening screw (1) characterized in that the metal body (5) has a radial widening in the region of the screw head (2) in order to form a contact face (16) for the fastening screw (1).

It is a further object of the present invention to provide a fastening screw (1) characterized in that the screw head (2) is formed by the insulating body (4).

It is a further object of the present invention to provide a fastening screw (1) characterized in that the external diameter ($D_{a1}$) of the screw head (2) is greater than the external diameter ($D_{a2}$) of the radial widening of the metal body (5).

It is a further object of the present invention to provide a fastening screw (1) characterized in that the insulating body (4) covers the second axial end (8) of the metal body (5) at the end face.

It is a further object of the present invention to provide a fastening screw (1) characterized in that the wall thickness of the metal body (5), at least in the region of the external thread (6), is 0.5 mm to 2.0 mm, preferably 0.7 mm to 1.5 mm, particularly preferably 0.8 mm to 12 mm and especially preferably approximately 1.0 mm.

It is a further object of the present invention to provide an electrical plug connector (20), having an electrically insulating plug connector housing (22), a contact element (23) and a fastening screw (1) according to one of Claims 1 to 12, wherein the contact element (23) is received in the plug connector housing (22) and is accessible at the end face for making contact with a mating contact element (24) of a mating plug connector (21), and wherein the fastening screw (1) is guided through a through-bore (14) of the contact element (23) in order to be usable for mechanical connection to an internal thread (30) of the mating plug connector (21).

It is a further object of the present invention to provide an electrical plug connector (20) characterized in that the shaft portion (10) of the insulating body (4) is dimensioned in such a way that the accessibility of the metal body (5) of the fastening screw (1) in a pre-assembled state of the fastening screw (1) in the plug connector (20) is obstructed, in particular obstructed for a human finger, as a result of the cooperation of the plug connector housing (22) and the shaft portion (10).

It is a further object of the present invention to provide an electrical plug connection (19), having an electrical plug connector (20) and an electrical mating plug connector (21), wherein the mating plug connector (21) has an electrically insulating mating plug connector housing (25), a mating contact element (24) and an internal thread (30), wherein the mating contact element (24) is received in the mating plug connector housing (25) and is accessible at the end face for making contact with the contact element (23) of the plug connector (20), and wherein the internal thread (30) is formed for mechanical connection to the external thread (8) of the metal body (5) of the fastening screw (1).

These and other objects of the invention will be described in detail, as is required, herein.

The figures each show preferred exemplary embodiments in which individual features of the present invention are illustrated in combination with each other. Features of one exemplary embodiment can be implemented in isolation from the other features of the same exemplary embodiment and, accordingly, can be easily combined with features of different exemplary embodiments by a person skilled in the art to realize further useful combinations and sub-combinations.

BRIEF DESCRIPTIONS OF THE DRAWINGS

Functionally similar elements are denoted by the same reference signs in the figures.

DETAILED WRITTEN DESCRIPTION OF THE PREFERRED EMBODIMENTS

This disclosure of the invention is submitted in furtherance of the Constitutional purposes of the U.S. Patent Laws "to promote the progress of science and the useful arts." (Article 1, Section 8).

Figure 1:
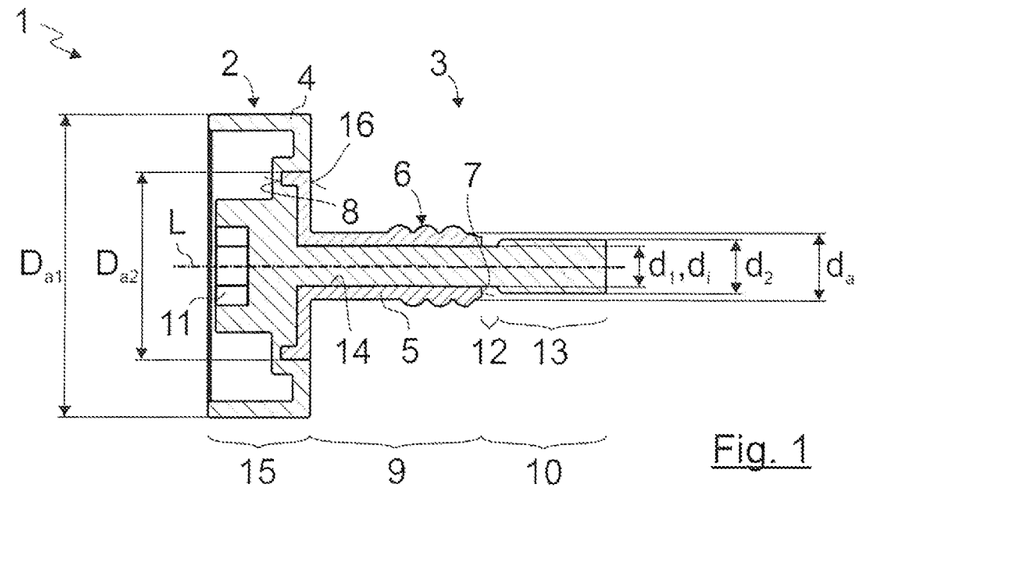
FIG. 1 shows a first exemplary embodiment of an inventive fastening screw in a cross-sectional illustration taken along the longitudinal axis.
Figure 2:
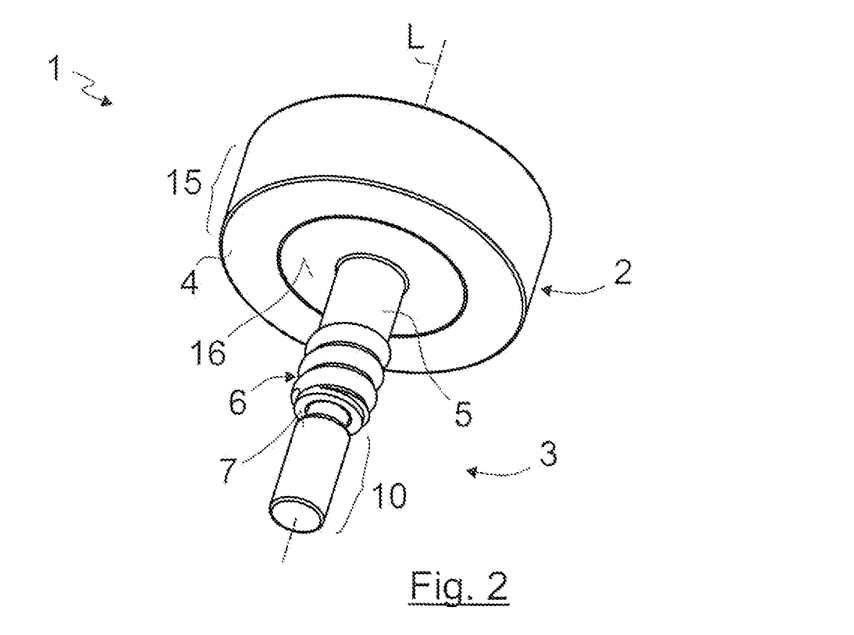
FIG. 2 shows the fastening screw of FIG. 1 in a perspective illustration.

FIGS. 1 and 2 show a fastening screw 1 according to a first exemplary embodiment of the invention. The fastening screw 1 has a screw head 2, and a screw shaft 3.

The fastening screw 1 comprises an electrically insulating insulating body 4 and a metal body 5 formed from a metal and having an external thread 6. The metal body 5 is fastened on the insulating body 4 and has a first axial end 7 and a second axial end 8 opposite the first axial end 7. The first axial end 7 is formed as a pointed end of the metal body 5 and tapers conically inwardly, at least in sections (although this is not compulsory). The first axial end 7 is remote from the screw head 2 of the fastening screw 1 and is therefore part of the screw shaft 3.

Within the context of a method for producing the fastening screw 1, the insulating body 4 can preferably be injection-molded into the metal body 5 by means of an injection molding procedure. Other production procedures are also essentially possible; however, injection molding, in particular, can result in a particularly robust fastening screw 1 which can be produced in a cost-effective manner.

The insulating body 4 has a fastening portion 9 extending axially through the metal body 5 along the longitudinal axis L and a shaft portion 10 emerging from the first axial end 7 of the metal body 5.

The screw head 2 of the fastening screw 1 is formed substantially by the insulating body 4. The insulating body 4 has, in the region of the screw head 2, an interface 11 for engagement of a tool for applying a torque to the fastening screw 1. This can be a hexagon socket, a hexalobular socket, a cross recess or another standard, for example, but is not limited to these examples.

The external thread 6 can be, in particular, a metric ISO thread, preferably of nominal size M5.

The shaft portion 10 emerging from the first axial end 7 of the metal body 5 has, in all exemplary embodiments, an axial first region 12 extending from the first axial end 7 of the metal body 5 (c.f. FIG. 1). In this case, the external diameter $d_1$ of the first region 12 corresponds to the internal diameter $d_i$ of the metal body 5.

In the exemplary embodiments shown in FIGS. 1 and 2 and 4 to 9, the shaft portion 10 moreover has an axial second region 13 extending from the first region 12 of the shaft portion 10 (c.f. FIG. 1), wherein the external diameter 62 of the second region 13 is greater than the internal diameter $d_i$ of the metal body 5. The touch protection can thus be further improved, wherein the first axial end 7 is nevertheless not covered by the insulating body 4 owing to the first region 12 arranged before the radial widening of the second region 13. As a result of the air gap provided by the first region 12, advantageous aeration and therefore heat dissipation from the metal body 5 can be provided. To further optimize the heat dissipation, the external diameter ds of the second region 13 can preferably be smaller than the external diameter $d_a$ of the metal body 5.

In the exemplary embodiments illustrated in FIGS. 1, 2 and 4 to 9, the insulating body 4, starting from the first axial end 7 of the metal body 5, proceeds through a through-bore 14 to the second axial end 8 of the metal body 5. The insulating body 4, by means of a head portion 15 (c.f. FIG. 1, for example), protrudes from the second axial end 8 of the metal body 5 along the longitudinal axis L of the metal body 5. In this case, the insulating body 4 covers the second axial end 8 of the metal body 5 at the end face and advantageously also provides touch protection for the second axial end 8 of the metal body 5. However, this is optional.

The metal body 5 forms a radial widening in the region of the screw head 2 in order to form a contact face 16 for the fastening screw 1 (so-called "chin" of the screw head 2).

The external diameter $D_{a1}$ of the screw head 2 or the insulating body 4 can be greater than the external diameter $D_{a2}$ of the radial widening or the contact face 16 of the metal body 5 (c.f. in particular FIG. 1).

The wall thickness of the metal body 5, at least in the region of the external thread 6, can be 0.5 mm to 2.0 mm, preferably 0.7 mm to 1.5 mm, particularly preferably 0.8 mm to 1.2 mm and especially preferably approximately 1.0 mm.

Figure 3:
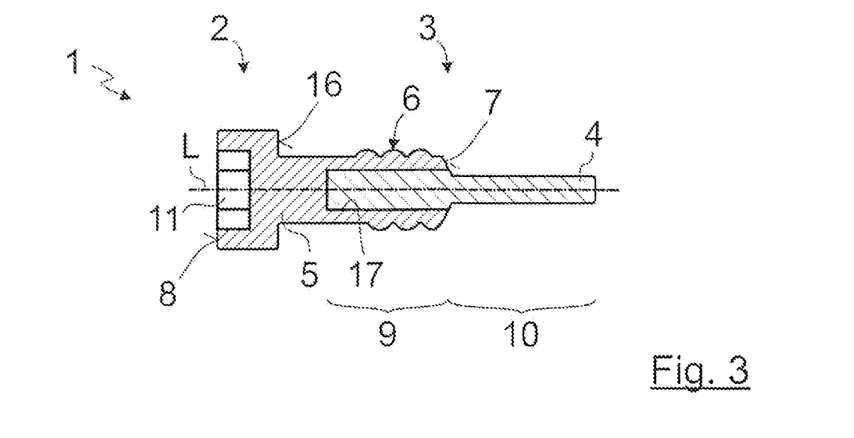
FIG. 3 shows a second exemplary embodiment of an inventive fastening screw in a cross-sectional illustration taken along the longitudinal axis.

FIG. 3 shows a second exemplary embodiment of an inventive fastening screw 1. In this case, the fastening screw 1 is formed substantially by the metal body 5. The metal body 5 forms the screw head 2 of the fastening screw entirely and therefore also has the interface 11 for engagement of the tool. The insulating body 4 is received in a blind hole 17 of the metal body 5 and emerges from the metal body 5 exclusively by means of its shaft portion 10. A conical tapering of the first axial end 7 is in turn provided. The conical extent of the pointed axial end can be optionally continued by the insulating body 4, as shown by way of example in FIG. 3. The shaft portion 10 and the metal body 5 together form the screw shaft 3. The metal body 5 in turn has a contact face 18 for the fastening screw 1.

In contrast to the first exemplary embodiment of FIGS. 1 and 2, the axial first region 12 of the shaft portion 10 extends over the entire length of the shaft portion 10 in the present case. A second region 13 is not provided.

Figure 4:
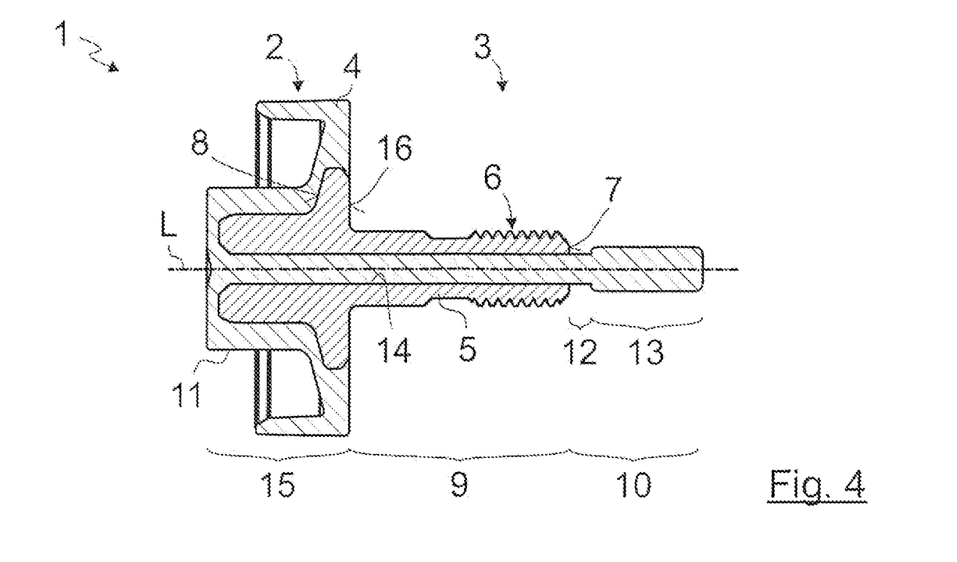
FIG. 4 shows a further preferred exemplary embodiment of an inventive fastening screw in a cross-sectional illustration taken along the longitudinal axis.
Figure 5:
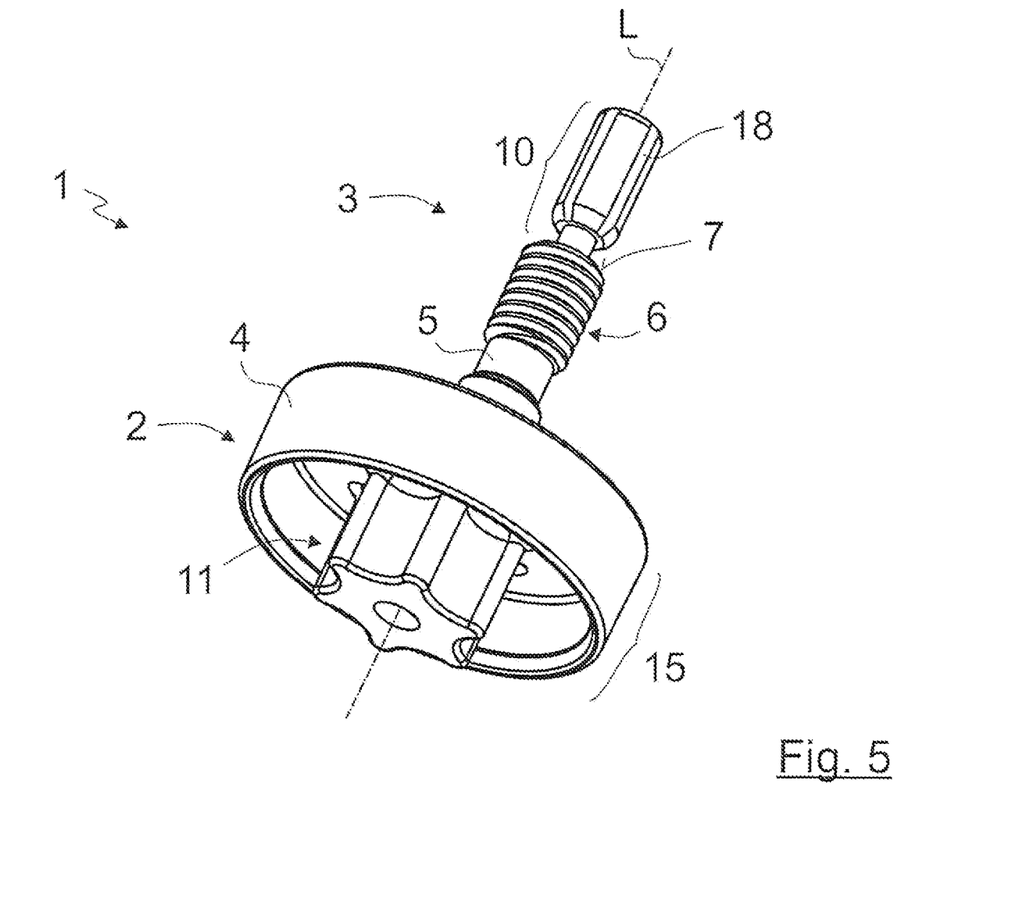
FIG. 5 shows the fastening screw of FIG. 4 in a perspective illustration.

FIGS. 4 and 5 show a further preferred exemplary embodiment of an inventive fastening screw, 1. The fastening screw 1 is formed in substantially the same way as the fastening screw 1 illustrated in FIGS. 1 and 2, but forms a larger part with the screw head 2 in the region of the second axial end 8. Stepped, conical tapered portions are provided in the region of the screw shaft 3. The insulating body 4 can be injection-molded into the through-bore 14, wherein the insulating body 4 emerges from the through-bore 14 by means of its shaft portion 10, but without covering the pointed, first axial end 7 of the metal body 5. The metal body 5 can moreover be overmolded with the insulating body 4 in the region of the second axial end 8 in order to provide particularly suitable touch protection for the screw head 2.

In particular, in order to improve the air circulation, the shaft portion 10 of the insulating body 4, in particular the axial second region 13 of the shaft portion 10, can have grooves or notches 18 (c.f. FIG. 5). Any number of grooves or notches 18 can be arranged such that they are distributed around the longitudinal axis L of the fastening screw 1.

Figure 6:
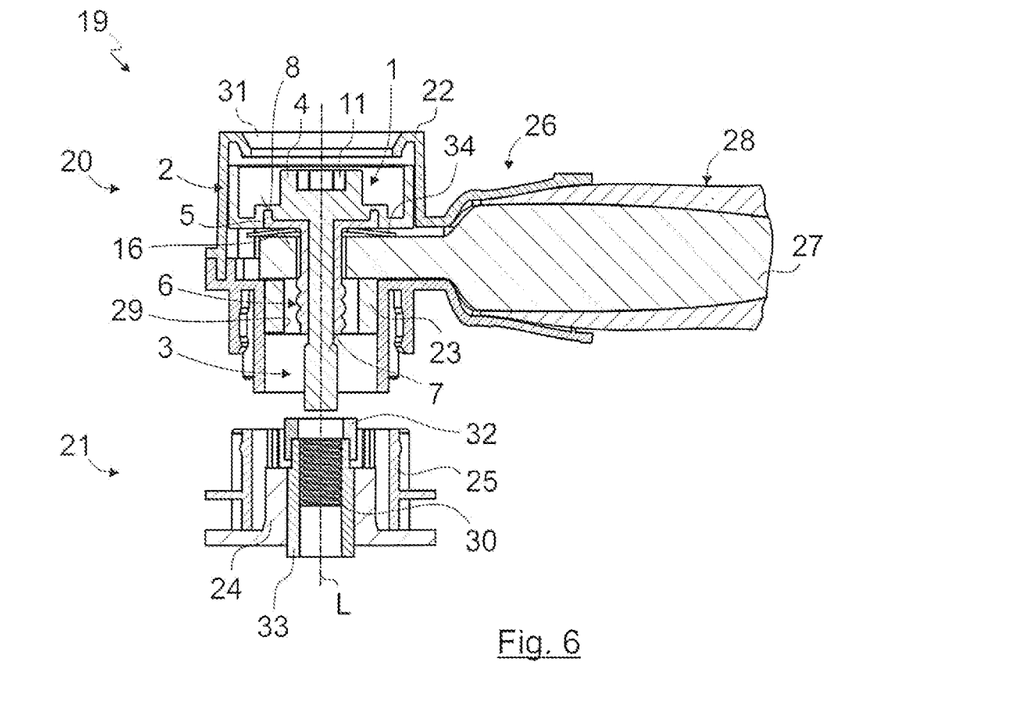
FIG. 6 shows a first exemplary embodiment of an inventive electrical plug connection with a fastening screw according to FIG. 1 in a cross-sectional illustration taken along the longitudinal axis of the fastening screw and shown in an unconnected state.
Figure 7:
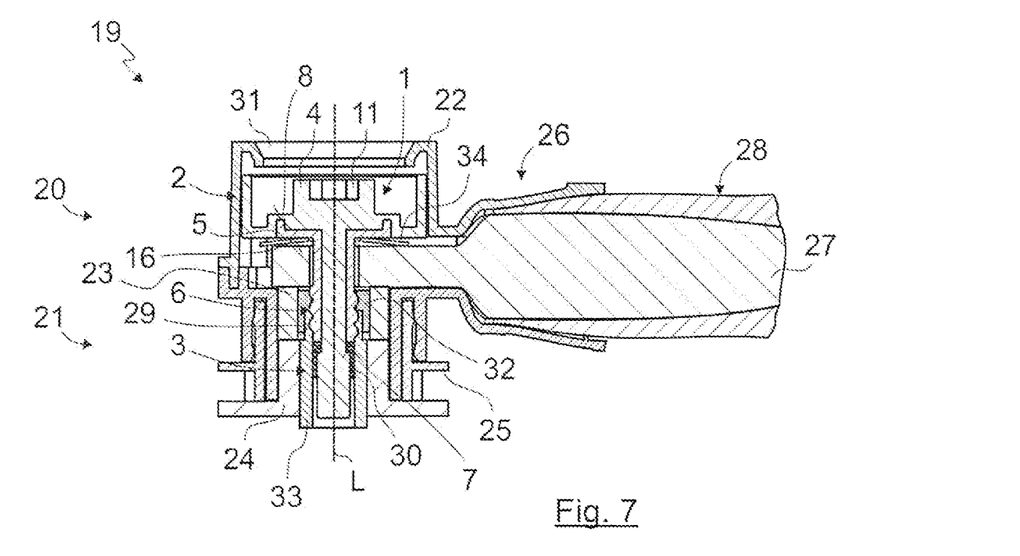
FIG. 7 shows the plug connection of FIG. 6 in a cross-sectional illustration taken along the longitudinal axis of the fastening screw and shown in a connected state.

FIGS. 6 and 7 show a first exemplary embodiment of an electrical plug connection 19 in the unconnected state (FIG. 6) and in the connected and closed state (c.f. FIG. 7). The electrical plug connection 19 has an electrical plug connector 20 and an electrical mating plug connector 21.

The electrical plug connector 20 has an electrically insulating plug connector housing 22, a contact element 23 and a fastening screw 1. By way of example, the fastening screw 1 illustrated in FIGS. 6 and 7 is the fastening screw 1 of the first exemplary embodiment of FIGS. 1 and 2.

The contact element 23 of the plug connector 20 is received in the plug connector housing 22 and is accessible at the end face for making contact with a mating contact element 24 of the mating plug connector 21.

The mating plug connector 21 has a mating plug connector housing 25, in which the mating contact element 24 is received. In the mechanically connected state of the plug connection 19 (c.f. FIG. 7), the contact element 23 and the mating contact element 24 make contact with one another.

The contact element 23 and the mating contact element 24 can be connected to an internal conductor 27 of an electric line 28 via a connection region 26.

The fastening screw 1 is guided through a through-bore 29 of the contact element 23 in order to be usable for mechanical connection to an internal thread 30 of the mating plug connector 21.

As a result of the external diameter $D_{a1}$ of the screw head 2 formed by the insulating body 4 being greater than the external diameter $D_{a2}$ of the radial widening or the contact face 16 of the metal body 5, touch protection of the contact element 23 can be advantageously provided by the housing opening 31 present for the actuation of the fastening screw 1.

At the same time, owing to the shaft portion 10 of the insulating body 4, the accessibility of the metal body 5 of the fastening screw 1 in a pre-assembled state (c.f. FIG. 6) can be obstructed, in particular for a human finger, as a result of the cooperation with the plug connector housing 22.

The mating plug connector 21 can also have measures for touch protection, for example a touch protection element 32 for covering the outer wall of the screw-nut 33 holding the internal thread 30 of the mating plug connector 21.

To improve the force transmission and safety of the screw connection, the electrical plug connector 20 can optionally have a washer and/or a screw locking device 34, which is arranged between the fastening screw 1 and the through-bore 29 of the contact element 23.

Figure 8:
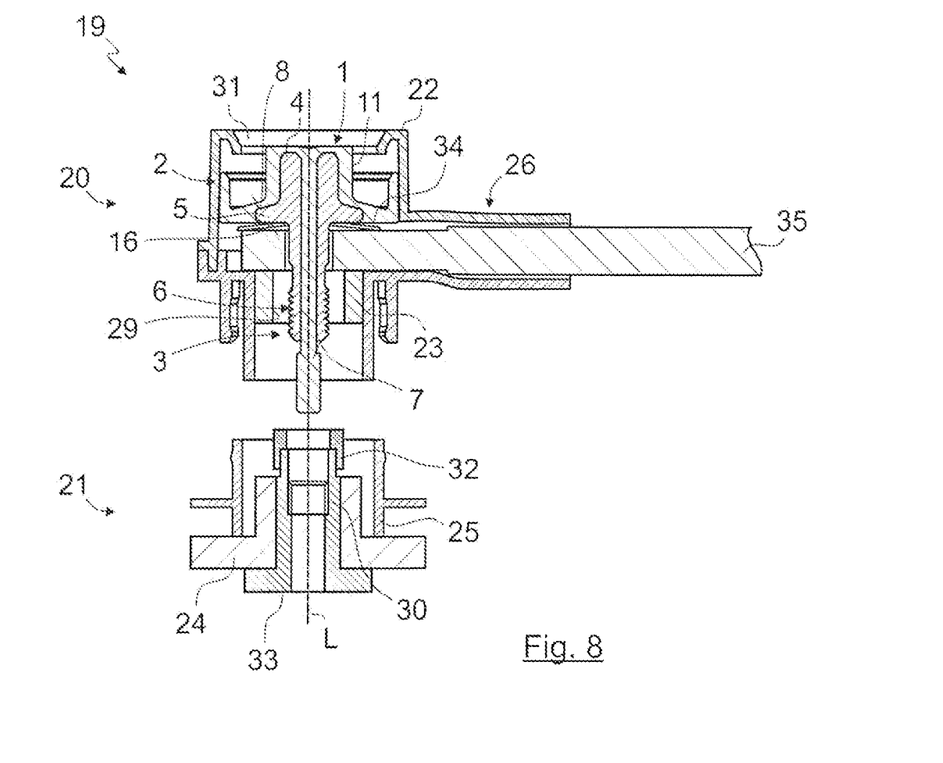
FIG. 8 shows a second exemplary embodiment of an inventive electrical plug connection with a fastening screw according to FIG. 4 in a cross-sectional illustration taken along the longitudinal axis of the fastening screw and shown in an unconnected state.
Figure 9:
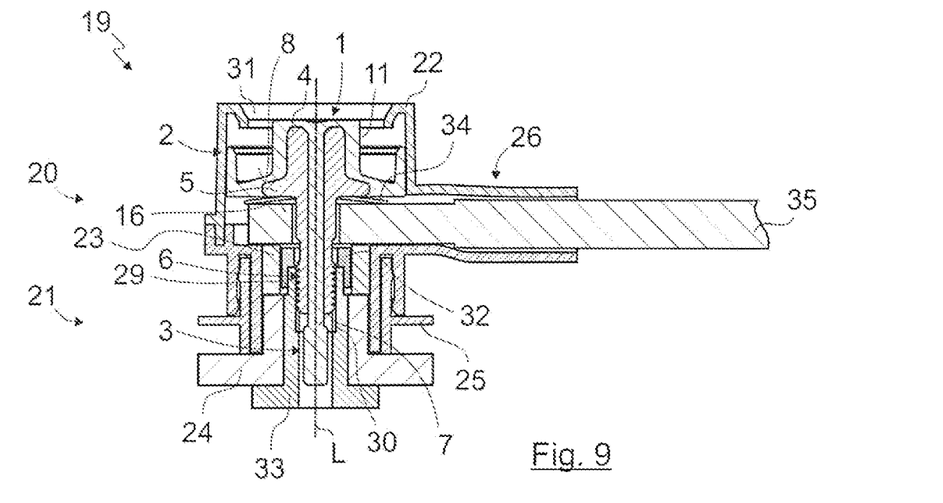
FIG. 9 shows the plug connection of FIG. 8 in a cross-sectional illustration taken along the longitudinal axis of the fastening screw and shown in a connected state.

An electrical plug connection 19 according to a preferred, second exemplary embodiment of the invention is illustrated in FIGS. 8 and 9, wherein the plug connection 19 is formed in substantially the same way as that described with regard to the first exemplary embodiment of FIGS. 6 and 7. However, by way of example, the contact element 23 of the plug connector 20 is connected to a busbar 35 via the connection region 26. Furthermore, by way of example, the preferred exemplary embodiment of the fastening screw 1 according to FIGS. 4 and 5 is preferably used.

OPERATION

Having described the structure of my fastening screw, electrical plug connector and electrical plug connection, its operation is briefly described.

A contact element 23 of an electrical plug-in connector 20 is provided, and is carried within an electrically insulating plug connector housing 22, and the electrical plug-in connector 20 electrically communicates with at least one of a source of a charging current, and a drive. A mating contact element 24 of a mating plug connector 21 is provided, and is carried within an electrically insulating mating plug connector housing 25, and the mating plug connector 21 electrically communicates with at least one of a source of a charging current, and a drive (the other of the contact element 23 connection). The contact element 23 and the mating contact element 24 are placed in adjacency to one another, and the fastening screw 1 is inserted into and through orifices (not shown) defined in the contact element 23, and the mating contact element 24, and the fastening screw 1 is axially rotated so that the external threads 6 engage with the internal threads 30 of the mating plug connector 21 so that an electrical connection is made, and maintained, between the contact element 23 and the mating contact 24.

A principal object of the present invention is to provide a fastening screw 1 comprising: a screw head 2; and an electrically insulating insulating body 4 that has a shaft portion 10; and a metal body 5 fastened on the electrically insulating insulating body 4, and wherein the metal body 5 has a first axial end 7, and a second axial end 8 opposite the first axial end 7, and the first axial end 7 is remote from the screw head 2, and the metal body 5 is formed from a metal and has an external thread 6 and defines a longitudinal axis L and the shaft portion 10 of the electrically insulating insulating body 4 emerges from the first axial end 7 of the metal body 5 along the longitudinal axis L of the metal body 5.

A further object of the present invention is to provide a fastening screw 1 wherein, the shaft portion 10 of the electrically insulating insulating body 4 emerging from the first axial end (7) of the metal body (5) has an axial first region (12) extending from the first axial end (7) of the metal body (5), and wherein an external diameter ($d_1$) of the axial first region (12) corresponds to an internal diameter ($d_i$) of the metal body 5.

A further object of the present invention is to provide a fastening screw 2 wherein, the shaft portion 10 of the electrically insulating insulating body 4 emerging from the first axial end (7) of the metal body (5) has an axial second region (13) extending from the axial first region (12) of the shaft portion (10), and wherein an external diameter ($d_2$) of the axial second region (13) is greater than the internal diameter ($d_i$) of the metal body (5).

A further object of the present invention is to provide a fastening screw 2 wherein, the external diameter ($d_2$) of the axial second region (13) is smaller than an external diameter ($d_a$) of the metal body (6).

A further object of the present invention is to provide a fastening screw 2 further comprising an axial groove 18 defined in the axial second region 13 of the shaft portion 10, and arranged around the longitudinal axis (L).

A further object of the present invention is to provide a fastening screw 2 wherein, the electrically insulating insulating body (4) extends through a through-bore (14) defined in the metal body 5 and extends from the first axial end (7) into the metal body (5).

A further object of the present invention is to provide a fastening screw 2 further comprising: a head portion 15 of the electrically insulating insulating body 4, and the head portion 15 of the electrically insulating insulating body 4 protrudes from the second axial end (8) of the metal body (5) along the longitudinal axis (L) of the metal body (5).

A further object of the present invention is to provide a fastening screw 2 wherein, the metal body (5) has a radial widening in the region of the screw head (2) to form a contact face (16) for the fastening screw (1).

A further object of the present invention is to provide a fastening screw 2 wherein, the screw head (2) is formed by the electrically insulating insulating body (4).

A further object of the present invention is to provide a fastening screw 2 wherein an external diameter ($D_{a1}$) of the screw head (2) is greater than an external diameter ($D_{a2}$) of the radial widening of the metal body (5).

A further object of the present invention is to provide a fastening screw 2 wherein, the electrically insulating insulating body (4) covers the second axial end (8) of the metal body (5) at an end face.

A further object of the present invention is to provide a fastening screw 2 wherein, a wall thickness of the metal body (5), at least in the region of the external thread (6), is approximately 0.5 mm to 2.0 mm.

A further object of the present invention is to provide an electrical plug connector 20 comprising: an electrically insulating plug connector housing 22; a contact element 23 received in the electrically insulating plug connector housing 22, and the contact element 23 has a through-bore, and an end face that is accessible; and a fastening screw 1, the fastening screw 1 having, a screw head 2; and an electrically insulating insulating body 4 that has a shaft portion 10; and a metal body 5 fastened on the electrically insulating insulating body 4, and wherein the metal body 5 has, a first axial end 7, and a second axial end 8, opposite the first axial end 7, and the first axial end 7 is remote from the screw head 2, and the metal body 5 is formed from a metal and has an external thread 6 and defines a longitudinal axis L, and the shaft portion 10 of the electrically insulating insulating body 4 emerges from the first axial end 7 of the metal body 5 along the longitudinal axis L of the metal body 5; and the fastening screw 1 is guided through the through-bore of the contact element 23, in order to be usable for mechanical interconnection to an internal thread 30 of a mating plug connector 21.

A further object of the present invention is to provide an electrical plug connector 20 wherein, the shaft portion (10) of the electrically insulating insulating body (4) is dimensioned in such a way that accessibility of the metal body (5) of the fastening screw (1) in a pre-assembled state of the fastening screw (1) in the plug connector (20) is obstructed for a human finger, by the cooperation of the plug connector housing (22) and the shaft portion (10).

A further object of the present invention is to provide an electrical plug connection comprising: an electrical plug connector 20 having, an electrically insulating plug connector housing 22; a contact element 23 received in the electrically insulating plug connector housing 22, and the contact element 23 has a through-bore and an end face that is accessible; and a fastening screw 1, the fastening screw 1 having, a screw head 2, and an electrically insulating insulating body 4 that has a shaft portion 10, and a metal body 5 fastened on the electrically insulating insulating body 4, and wherein the metal body 5 has a first axial end 7, and a second axial end 8 opposite the first axial end 7, and wherein the first axial end 7 is remote from the screw head 2, and the metal body 5 is formed from a metal and has an external thread 8 and defines a longitudinal axis L, and the shaft portion 10 of the electrically insulating insulating body 4 emerges from the first axial end 7 of the metal body 5 along the longitudinal axis L of the metal body 5; and the fastening screw 1 is guided through the through-bore of the contact element 23, and the fastening screw 1 provides a mechanical connection to the internal thread 30 defined in the mating plug connector 21; and an electrical mating plug connector 21 and wherein the electrical mating plug connector 21 has an electrically insulating mating plug connector housing 22, and a mating contact element 24 that is received in the mating plug connector housing 22, and the mating contact element 24 has an end face that is accessible for making contact with the end face of the contact element 23 of the plug connector 20 and, the mating contact element 24 has an internal thread 30 for mechanical connection to the external thread 6 of the metal body 5 of the fastening screw 1.

A further object of the present invention is to provide a fastening screw 1 wherein, the insulating body 4 is received in a blind hole 17 defined in the first axial end 7 of the metal body 5.

A further object of the present invention is to provide a fastening screw 1 as claimed in Claim 1 and wherein, a wall thickness of the metal body 5, at least in the region of the external thread 6, is approximately 1.0 mm.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

The invention claimed is:

1. A fastening screw comprising:
   a screw head; and
   an electrically insulating body that has a shaft portion; and
   a metal body fastened on an outer circumferential surface
      of a portion of the shaft portion of the electrically insulating body, and wherein
      the metal body has a first axial end, and a second axial end opposite the first axial end, and the first axial end is remote from the screw head, and
      the metal body defines a continuous external thread and defines a longitudinal axis, and
      the shaft portion of the electrically insulating body emerges from the first axial end of the metal body along the longitudinal axis of the metal body; and
   wherein
      the shaft portion of the electrically insulating body emerging from the first axial end of the metal body has an axial first region extending from the first axial end of the metal body, and wherein an external diameter ($d_1$) of the axial first region corresponds to an internal diameter ($d_i$) of the metal body, or the external diameter ($d_1$) of the axial first region is smaller than the internal diameter ($d_i$) of the metal body.

2. The fastening screw as claimed in claim 1 and wherein, the shaft portion of the electrically insulating body emerging from the first axial end of the metal body has an axial second region extending from the axial first region of the shaft portion, and wherein an external diameter ($d_2$) of the axial second region is greater than the internal diameter ($d_i$) of the metal body.

3. The fastening screw as claimed in claim 2 and wherein, the external diameter ($d_2$) of the axial second region is smaller than an external diameter ($d_a$) of the metal body.

4. The fastening screw as claimed in claim 2 and further comprising:
an axial groove defined in the axial second region of the shaft portion, and arranged around the longitudinal axis (L).

5. The fastening screw as claimed in claim 1 and wherein, the electrically insulating body extends through a through-bore defined in the metal body and extends from the first axial end into the metal body.

6. The fastening screw as claimed in claim 1 and further comprising:
a head portion of the electrically insulating body, and the head portion of the electrically insulating body protrudes from the second axial end of the metal body along the longitudinal axis (L) of the metal body.

7. The fastening screw as claimed in claim 1 and wherein, the metal body has a radial widening in the region of the screw head to form a contact face for the fastening screw.

8. The fastening screw as claimed in claim 7 and wherein an external diameter ($D_{a1}$) of the screw head is greater than an external diameter ($D_{a2}$) of the radial widening of the metal body.

9. The fastening screw as claimed in claim 1 and wherein, the screw head is formed by the electrically insulating body.

10. The fastening screw as claimed in claim 1 and wherein, the electrically insulating body covers the second axial end of the metal body at an end face.

11. The fastening screw as claimed in claim 1 and wherein, a wall thickness of the metal body, at least in the region of the external thread, is approximately 0.5 mm to 2.0 mm.

12. The fastening screw as claimed in claim 1 and wherein, the insulating body is received in a blind hole defined in the first axial end of the metal body.

13. The fastening screw as claimed in claim 1 and wherein, a wall thickness of the metal body, at least in the region of the external thread, is approximately 1.0 mm.

14. An electrical plug connector comprising:
an electrically insulating plug connector housing;
a contact element received in the electrically insulating plug connector housing, and the contact element has a through-bore, and an end face that is accessible; and
a fastening screw, the fastening screw having,
a screw head, and
an electrically insulating body that has a shaft portion, and
a metal body fastened on the electrically insulating body, and wherein the metal body has,
a first axial end, and a second axial end, opposite the first axial end, and the first axial end is remote from the screw head, and
the metal body is formed from a metal and has an external thread and defines a longitudinal axis, and
the shaft portion of the electrically insulating body emerges from the first axial end of the metal body along the longitudinal axis of the metal body; and
the fastening screw is guided through the through-bore of the contact element, in order to be usable for mechanical connection to an internal thread of a mating plug connector; and wherein
the shaft portion of the electrically insulating body emerging from the first axial end of the metal body has an axial first region extending from the first axial end of the metal body, and wherein an external diameter ($d_1$) of the axial first region corresponds to an internal diameter ($d_i$) of the metal body, or the external diameter ($d_1$) of the axial first region is smaller than the internal diameter ($d_i$) of the metal body.

15. The electrical plug connector as claimed in claim 14 and wherein, the shaft portion of the electrically insulating body is dimensioned in such a way that accessibility of the metal body of the fastening screw in a pre-assembled state of the fastening screw in the plug connector is obstructed for a human finger, by the cooperation of the plug connector housing and the shaft portion.

16. An electrical plug connection comprising:
an electrical plug connector having,
an electrically insulating plug connector housing;
a contact element received in the electrically insulating plug connector housing, and the contact element has a through-bore and an end face that is accessible; and
a fastening screw, the fastening screw having,
a screw head, and
an electrically insulating body that has a shaft portion, and
a metal body fastened on the electrically insulating body, and wherein the metal body has a first axial end, and a second axial end opposite the first axial end, and wherein the first axial end is remote from the screw head, and the metal body is formed from a metal and has an external thread and defines a longitudinal axis, and
the shaft portion of the electrically insulating body emerges from the first axial end of the metal body along the longitudinal axis of the metal body; and
the fastening screw is guided through the through-bore of the contact element, and the fastening screw provides a mechanical connection to the internal thread defined in the mating plug connector; and
an electrical mating plug connector, and wherein the electrical mating plug connector has an electrically insulating mating plug connector housing, and a mating contact element that is received in the mating plug connector housing, and the mating contact element has an end face that is accessible for making contact with the end face of the contact element of the plug connector, and the mating contact element has an internal thread for mechanical connection to the external thread of the metal body of the fastening screw; and wherein
the shaft portion of the electrically insulating body emerging from the first axial end of the metal body has an axial first region extending from the first axial end of the metal body, and wherein an external diameter ($d_1$) of the axial first region corresponds to an internal diameter ($d_i$) of the metal body, or the external diameter ($d_1$) of the axial first region is smaller than the internal diameter ($d_i$) of the metal body.

\* \* \* \* \*